April 29, 1958   C. BRAMMING   2,832,491
VACUUM BOTTLE
Filed Nov. 8, 1954
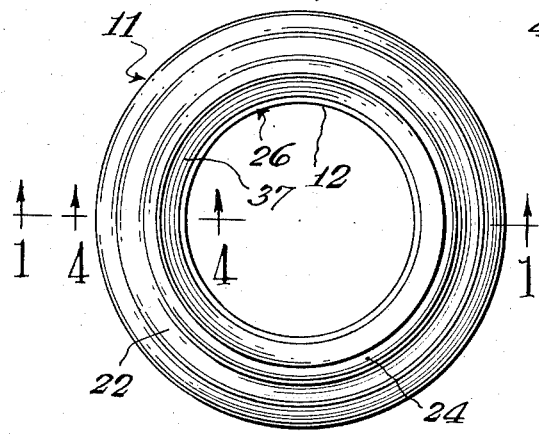
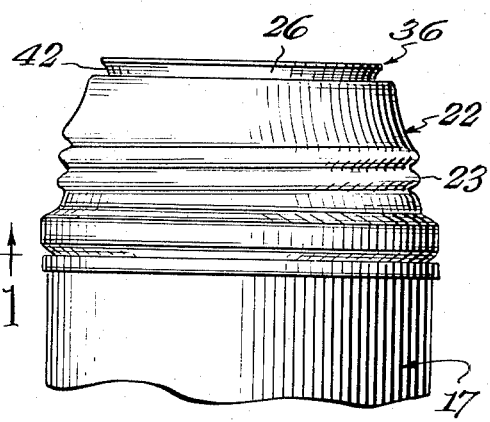
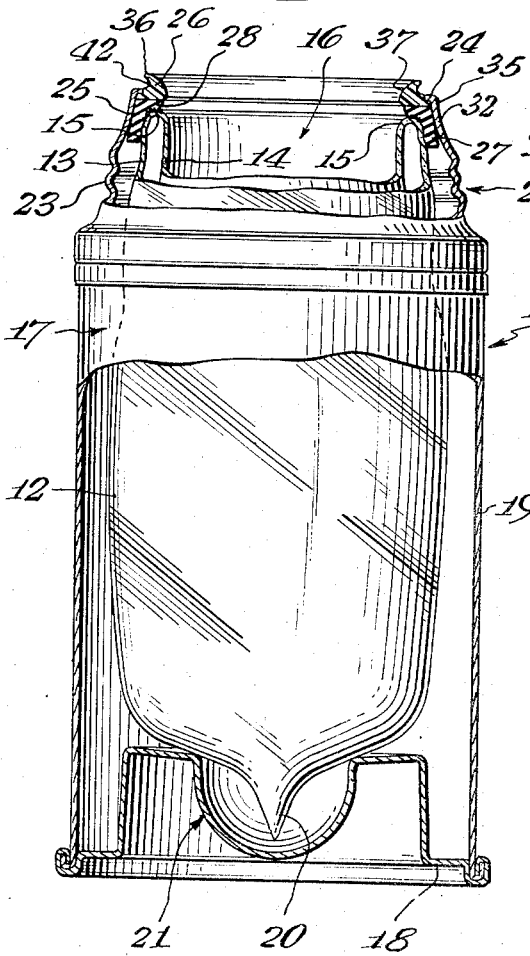
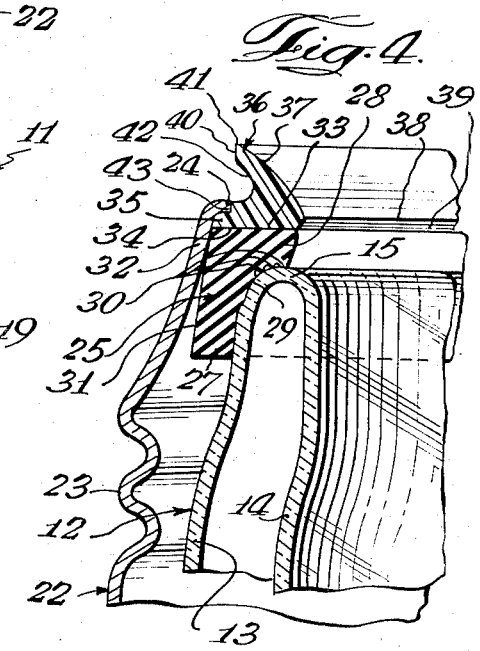
INVENTOR.
Carl Bramming
BY
Toms, McDougall, Williams
& Hersh    Attorneys

United States Patent Office 2,832,491
Patented Apr. 29, 1958

2,832,491

VACUUM BOTTLE

Carl Bramming, Nashville, Tenn., assignor to Aladdin Industries, Incorporated, Nashville, Tenn., a corporation of Illinois Application November 8, 1954, Serial No. 467,511

2 Claims. (Cl. 215—13)

This invention relates to a new and improved vacuum bottle or the like.

One principal object of the invention is to provide a vacuum bottle having an improved pouring lip construction whereby the contents of the bottle may be poured efficiently and with practically no dripping or spilling.

Another object of the invention is to provide a vacuum bottle having a pouring arrangement which includes a pair of annular elements, one forming an efficient pouring lip and the other effecting a seal between the pouring lip and the glass, vacuum-insulated receptacle or filler of the vacuum bottle.

A further object of the invention is to provide a pouring lip construction which is effective and highly durable, yet is extremely simple to manufacture and low in cost.

Another object is to provide a pouring lip construction which may be employed with vacuum bottle fillers of conventional construction.

Further objects and advantages of the invention will appear from the following description, taken with the accompanying drawings, in which:

Fig. 1 is an elevational view of an exemplary vacuum bottle constituting an illustrative embodiment of the invention, the view being partly in section along a line 1—1 in Fig. 3;

Fig. 2 is a fragmentary elevational view showing the upper end of the vacuum bottle of Fig. 1;

Fig. 3 is a plan view of the vacuum bottle; and

Fig. 4 is a greatly enlarged fragmentary elevational sectional view taken generally along a line 4—4 in Fig. 3.

If the drawings are considered in greater detail, it will be seen that they illustrate an exemplary vacuum bottle 11 provided with a glass, vacuum-insulated receptacle or filler 12, which may be of conventional or suitable construction. It will be seen that the vacuum-insulated filler 12 is provided with outer and inner walls 13 and 14 joined at their upper ends to define a top edge or lip 15 which is rounded in shape. In this instance, the filler 12 has a wide mouth 16 encircled by the top edge 15, but it will be understood that the invention may also be applied to more conventional narrow-mouthed vacuum bottles.

To protect the fragile glass filler 12 from breakage, the vacuum bottle 11 is provided with the protective jacket or casing 17 having a bottom wall 18 closing the lower end of a side wall 19 which may be generally cylindrical in form, as shown. As is conventional, the outer wall 13 of the filler is formed with an axial tubulation 20 which is protected by an upwardly extending resilient member 21 carried by the lower wall 18 of the jacket 17.

To encircle and protect the upper end of the glass filler 12, the protective jacket 17 is provided with an annular collar 22, which may be formed integrally with the jacket, but preferably is formed as a separate member threaded into or otherwise disengageably mounted on the side wall 19 of the jacket. External threads 23 may be formed on the collar 22 to receive a cap (not shown) which will serve both as a protective closure for the upper end of the vacuum bottle and as a cup for receiving the contents of the bottle. In the illustrated construction, the upper end of the collar 22 is formed into an inturned annular flange 24.

In accordance with the invention, provision is made for facilitating the pouring of the contents of the filler 12. To this end, the illustrated vacuum bottle 11 is provided with a two-part pouring lip construction comprising a pair of rings 25 and 26 received between the collar flange 24 and the top edge 15 of the receptacle 12. To exclude the contents of the filler 12 from the space between the filler and the collar 22, the ring 25 is made of a soft resilient material such as synthetic rubber or the like. A depending annular skirt 27 is formed on the ring 25 to encircle the outer wall of the receptacle 12 immediately below the top edge 15. At the upper end of the soft resilient ring 25, a flange 28 extends radially inwardly over approximately the outer half of the rounded top edge 15 of the filler 12. It will be seen that the skirt 27 and the flange 28 define a curved undersurface 29 which intimately engages the rounded top edge 15. On the underside of the inturned flange 28, a plurality of annular ribs 30 may be formed along the curved surface 29 to effect a perfect seal with the rounded top edge 15.

In order to center the upper end of the filler 12 within the collar 22, the sealing ring 25 is formed with a generally cylindrical outer peripheral surface 31 which has a slight upward taper. This outer surface 31 is snugly received at its upper end within an upwardly tapering wall element 32 formed on the collar 22 immediately below the inturned flange 24. A seal is formed between the rings 25 and 26 by means of an upwardly facing surface 33 on the sealing ring 25, and a corresponding downwardly facing surface 34 on the ring 26. In this instance, both of these intimately interengaging surfaces 33 and 34 are substantially flat and horizontal.

To retain the ring 26 against the sealing ring 25, an outwardly extending flange 35 is formed at the lower end of the ring 26 and is received between the collar flange 24 and the ring 25. An upstanding, outwardly directed pouring lip 36 is formed on the upper end of the ring 26 to provide for efficient pouring of the contents of the filler 12.

It will be seen that a curved annular upper surface 37 flares upwardly and outwardly toward the pouring lip 36 from a point adjacent the upper end of the sealing ring 25. At the lower end of the flaring upper surface 37, the ring 26 is provided with an inner annular edge 38 which overlies the top edge 15 of the filler 12. In the illustrated structure, the inner edge 38 extends inwardly beyond the inner edge of the inturned flange 28 on the sealing ring 25 so that the sealing ring will not afford any substantial obstruction to the outward flow of the contents of the filler 12. As shown, a beveled or chamfered annular surface 39 is formed on the pouring ring 26 in undercutting relation to the inner annular edge 38.

On the outside of the pouring ring 26, a generally cylindrical surface 40 is formed at the extreme upper end of the pouring lip 36 to define a sharp edge 41 at the intersection of the surface 40 and the flaring upper surface 37. Immediately below the narrow surface 40, an annular groove 42 is formed on the outside of the pouring ring 26 in undercutting relation to the pouring lip 36. The groove 42 is curved in cross section so that the lip 36 tapers toward its outer edge. Below the groove 42, the pouring ring 26 is formed with a narrow generally cylindrical surface 43 which is received within the inturned collar flange 24 so as to center the ring 26 relative to the collar 22. It will be seen that the surface 40 at the upper end of the pouring lip 36 is made smaller in diameter than the opening defined by the collar flange 24 so that the pouring lip 36 may be inserted upwardly through the flange 24 in assembling the vacuum bottle 11.

While the pouring ring 26 may be made of a variety of materials ranging from metal to rubber, it is preferred to mold the pouring ring from a resinous synthetic plastic material. In this way, the ring 26 will be extremely durable and easy to clean.

It will be realized that the pouring ring 26 and the sealing ring 25 are clamped between the collar 22 and the filler 12 when the collar is screwed into the protective jacket 17. The ring 25 seals the joints between its surfaces 29 and 33 and the mating surfaces on the filler and the pouring ring 26, with the result that liquid is excluded from the joints. This arrangement facilitates the cleaning of the vacuum bottle and maintains the bottle in a sanitary condition.

Because of the provision of the thin, outwardly directed pouring lip 36 and the undercutting groove 42, the liquid contents of the vacuum bottle may be poured at any desired rate, however slow, without tending to run down the side of the vacuum bottle. The provision of the smoothly curved, flaring surface 37 also contributes to the enhanced pouring efficiency of the vacuum bottle.

Since the rings 25 and 26 defining the pouring lip construction are formed as separate parts, the ring 25 may be formed of a soft, resilient, rubber-like material to afford a perfect seal with the glass filler 12, while the ring 26 may be formed from a relatively hard, rigid material so that the external pouring lip will be easy to clean and attractive in appearance.

The vacuum bottle may be readily assembled by inserting the glass filler into the protective jacket, mounting the sealing ring 25 on the top of the filler, adding the pouring ring 26 on top of the sealing ring, and mounting the collar on the jacket so that the pouring lip will pass upwardly through the collar as the rings are clamped against the top of the filler.

Various modifications, alterations, constructions, and equivalents may be employed without departing from the true spirit and scope of the invention as exemplified in the foregoing description and defined in the following claims.

I claim:

1. In a vacuum bottle, the combination comprising a double walled vacuum insulated receptacle having a mouth with a rounded annular top edge therearound, a protective casing disposed around said receptacle, said casing including an upper portion extending around the upper end of said receptacle and having a top opening with an inturned annular flange disposed therearound substantially above the level of said top edge of said receptacle, a soft resilient sealing ring disengageably received between said upper portion of said casing and said receptacle, said sealing ring having an inturned flange extending over and engaging said top edge of said receptacle and a depending skirt encircling and engaging the upper end of said receptacle below said top edge, said sealing ring having an annular upwardly facing surface thereon, and a substantially hard, rigid pouring ring having an annular lower surface seated on said upwardly facing surface of said sealing ring, said pouring ring having an outwardly projecting flange disposed between and engaging said sealing ring and said inturned flange on said casing, said pouring ring and said sealing ring thereby being disengageably clamped between said inturned collar flange and said top edge on said receptacle, said pouring ring having an upstanding annular portion extending above said outwardly projecting flange and through said top opening in closely fitting relation thereto, said upstanding portion having a curved flaring annular upper surface beginning adjacent said top edge of said receptacle and extending upwardly and outwardly therefrom, said upstanding portion having an external annular groove therein disposed above said inturned flange on said casing and defining an outwardly directed overhanging annular pouring lip at the upper end of said upstanding portion, said groove being in undercutting relation to said pouring lip with said lip overhanging said groove, said lip having an outside diameter less than the diameter of said top opening and thereby being insertable therethrough.

2. In a vacuum bottle, the combination comprising a double walled vacuum insulated receptacle having a mouth with a rounded annular top edge therearound, a protective casing disposed around said receptacle and comprising a generally cylindrical upper portion extending around the upper end of said receptacle and having a top opening with an inturned annular flange disposed therearound substantially above the level of said top edge of said receptacle, a soft resilient sealing ring disengageably received between said upper portion of said casing and said receptacle, said sealing ring having a depending skirt encircling and engaging the upper end of said receptacle below said top edge, said sealing ring having an upper portion with an inturned flange extending over and engaging said top edge of said receptacle, said sealing ring having an annular upwardly facing surface thereon, and a substantially hard rigid pouring ring having an annular downwardly facing surface seated on said upwardly facing surface on said sealing ring, said pouring ring having a lower portion with an outwardly projecting flange disposed between and engaging said sealing ring and said inturned flange on said casing, said pouring ring and said sealing ring thereby being disengageably clamped between said inturned casing flange and said top edge on said receptacle, said pouring ring having an upstanding annular portion extending above said outwardly projecting flange and through said top opening in closely fitting relation thereto, said pouring ring having a curved flaring annular upper surface beginning adjacent said top edge of said receptacle and extending upwardly and outwardly therefrom, said pouring ring having an external annular groove therein disposed above said inturned casing flange and defining an annular pouring lip at the upper end of said pouring ring, said groove being in undercutting relation to said pouring lip with said lip overhanging said groove, said upper surface of said pouring ring extending upwardly and outwardly to said pouring lip, said pouring lip having an outside diameter less than the diameter of said top opening and thereby being insertable upwardly therethrough.

References Cited in the file of this patent

UNITED STATES PATENTS

| 1,448,996 | Donath | Mar. 20, 1923 |
| 1,877,290 | Forrest | Sept. 13, 1932 |
| 2,163,057 | Payson | June 20, 1939 |

FOREIGN PATENTS

| 294,156 | Great Britain | July 19, 1928 |
| 407,623 | Germany | Apr. 15, 1921 |